United States Patent
Dutta (10) Patent No.: US 9,633,224 B1
(45) Date of Patent: *Apr. 25, 2017

(54) PROTECTING SENSITIVE DATA PRIOR TO REACHING THE CLOUD

(71) Applicant: American Express Travel Related Services Company, Inc., New York, NY (US)

(72) Inventor: Siddhartha Dutta, Peoria, AZ (US)

(73) Assignee: AMERICAN EXPRESS TRAVEL RELATED SERVICES COMPANY, INC., New York, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 15/165,878

(22) Filed: May 26, 2016

Related U.S. Application Data (63) Continuation of application No. 14/272,262, filed on May 7, 2014.

(51) Int. Cl.
  *G06F 21/00* (2013.01)
  *G06F 21/62* (2013.01)
  *G06F 21/60* (2013.01)

(52) U.S. Cl.
  CPC ........ *G06F 21/6245* (2013.01); *G06F 21/602* (2013.01); *G06F 2221/2107* (2013.01)

(58) Field of Classification Search
  CPC ............... G06F 21/602; G06F 21/6245; G06F 2221/2107
  See application file for complete search history.

(56) References Cited

U.S. PATENT DOCUMENTS

| | | | |
|---|---|---|---|
| 7,239,226 B2 | 7/2007 | Berardi et al. | |
| 7,627,531 B2 | 12/2009 | Breck et al. | |
| 8,402,555 B2 | 3/2013 | Grecia | |
| 8,458,487 B1* | 6/2013 | Palgon | G06F 21/00 380/277 |
| 8,533,860 B1 | 9/2013 | Grecia | |
| 8,887,308 B2 | 11/2014 | Grecia | |
| 2007/0113171 A1* | 5/2007 | Behrens | G06F 15/7842 715/239 |
| 2011/0154467 A1 | 6/2011 | Bomar et al. | |
| 2011/0213807 A1 | 9/2011 | Mattsson | |
| 2011/0307710 A1 | 12/2011 | McGuire et al. | |
| 2012/0173431 A1 | 7/2012 | Ritchie et al. | |
| 2012/0278339 A1 | 11/2012 | Want | |

(Continued)

OTHER PUBLICATIONS

USPTO, Office Action dated Aug. 5, 2015 in U.S. Appl. No. 14/272,262.

(Continued)

*Primary Examiner* — Kendall Dolly
(74) *Attorney, Agent, or Firm* — Snell & Wilmer L.L.P.

(57) ABSTRACT

The present disclosure includes a method comprising encrypting sensitive data, generating a token comprising a data identifier, tokenizing the encrypted sensitive data, and/or storing the encrypted sensitive data in association with the token to a token vault. Tokenizing may comprise mapping the encrypted sensitive data to the token. The method may further comprise storing the token to a cloud application, wherein the cloud application comprises a software application that functions within a cloud computing environment.

16 Claims, 4 Drawing Sheets

(56) References Cited

U.S. PATENT DOCUMENTS

2012/0278897 A1* 11/2012 Ang .................. H04L 61/2596
                                                                726/26
2013/0246422 A1    9/2013 Bhargava et al.

OTHER PUBLICATIONS

USPTO, Final Office Action dated Oct. 20, 2015 in U.S. Appl. No. 14/272,262.
USPTO, Advisory Action dated Dec. 15, 2015 in U.S. Appl. No. 14/272,262.
USPTO, Notice of Allowance dated May 4, 2016 in U.S. Appl. No. 14/272,262.
WIPO, International Preliminary Report on Patentability dated Oct. 26, 2015 in Appl. No. PCT/US2015/024877.
Summers, "Tokenization in Depth—A Detailed Look at Tokenization and its Advantages over Encryption," Shift4 Secure Payment Processing, 2010, Shift4 Corporation, 1-12.
WIPO, International Search Report and Written Opinion dated Jul. 20, 2015 in Appl. No. PCT/US2015/024877.

* cited by examiner

PROTECTING SENSITIVE DATA PRIOR TO REACHING THE CLOUD

CROSS-REFERENCE TO RELATED APPLICATIONS

This application is a continuation of, claims priority to and the benefit of, U.S. Ser. No. 14/272,262 filed May 7, 2014 and entitled "SYSTEMS AND METHODS FOR DOCUMENT AND DATA PROTECTION," which is incorporated by reference herein in its entirety.

FIELD

The present disclosure generally relates to document and data protection, and more particularly, to systems and methods for the protection of sensitive documents and/or data in conjunction with a cloud computing application, or external hosting services.

BACKGROUND

At present, enterprise documents and data are protected in several ways, each having their respective disadvantages. Briefly, documents and/or data may be encrypted and uploaded to a cloud computing application. Obviously, this method leaves sensitive data and/or documents exposed to unwanted decryption if encryption keys are breached. In addition, encryption may break application/user functions such as Search, Sort, etc. In addition, many cloud providers will not accept documents exceeding a certain file size (e.g., five megabytes). Moreover, company policies may prohibit the exportation of sensitive data to a cloud application, while some markets (e.g., China, Germany, and Switzerland) may have very strict data exportation laws, such that documents and/or data stored in a Europe-based cloud may not be exported, for example, to a United States based location.

To mitigate some of these problems, various enterprises have stored unencrypted documents and/or data to a local data storage system (e.g., a token vault or file system) through the use of a tokenization system. To gain access to this data, and to leverage cloud applications for data and document distribution within the enterprise, the data and/or documents have been tokenized (i.e., associate the documents or data with a random alphanumeric string or file path) and the token stored to the cloud application. Disadvantages exist here as well. For example, a hacker or disgruntled employee may hack into the token vault or file system, and gain access to the unencrypted documents and/or data stored on the enterprise system.

SUMMARY

The present disclosure includes a method comprising of a system or process that entails encrypting sensitive data, generating a token comprising a data identifier, tokenizing the encrypted sensitive data, and/or storing the encrypted sensitive data in association with the token to a token vault. Tokenizing may comprise mapping the encrypted sensitive data to the token. The method may further comprise storing the token to a cloud application, wherein the cloud application comprises a software application that functions within a cloud computing environment. In addition, the token comprises a randomly generated value. Moreover, the system may retrieve the token from a cloud application and/or identify the encrypted sensitive data, based upon a token associated with the encrypted sensitive data. The system may also decrypt the encrypted sensitive data and present it to the user.

The present disclosure further includes a method for encrypting a sensitive document. The method may include encrypting the sensitive document to create an encrypted sensitive document, generating a token comprising a document identifier, tokenizing the encrypted sensitive document, and/or storing the encrypted sensitive document to a local file storage system. Tokenizing may comprise associating the token with the encrypted sensitive document, and a token may comprise a file path. The method may also include storing the token to a cloud application, wherein the cloud application that comprises a software application that functions within a cloud computing environment. The method may, in addition, comprise receiving a request for the sensitive document. The method may include receiving the token from a cloud application and/or identifying the encrypted sensitive document, based upon a token associated with the encrypted sensitive document. The system may also decrypt the encrypted sensitive document and present it to the user.

BRIEF DESCRIPTION OF THE DRAWINGS

The features and advantages of the present disclosure will become more apparent from the detailed description set forth below when taken in conjunction with the drawings. The left-most digit of a reference number identifies the drawing in which the reference number first appears.

DETAILED DESCRIPTION

The detailed description of exemplary embodiments herein makes reference to the accompanying drawings, which show the exemplary embodiments by way of illustration and their best mode. While these exemplary embodiments are described in sufficient detail to enable those skilled in the art to practice the disclosure, it should be understood that other embodiments may be realized and that logical and mechanical changes may be made without departing from the spirit and scope of the disclosure. Thus, the detailed description herein is presented for purposes of illustration only and not of limitation. For example, the steps recited in any of the method or process descriptions may be executed in any order and are not limited to the order presented. Moreover, any of the functions or steps may be outsourced to or performed by one or more third parties. Furthermore, any reference to singular includes plural embodiments, and any reference to more than one component may include a singular embodiment.

As used herein, a "document" may comprise any record (e.g., electronic record) that provides, comprises, and/or includes information. A document may, in various embodiments, be referenced and accessed by a file path associated with the document (e.g., C:/mydocuments/patent applications/systems and methods for document and data protection).

As used herein, "data" (or a "data element") may comprise any information whatsoever. Thus, data may not be accessible, as above, via a file path. Rather, data may comprise, for example, a transaction account (credit card) number, expiry date, and the like.

As used herein, a document or data may be "tokenized" by associating an identifier with the document and/or data. For example, a document may be tokenized by associating a file path or "token" with the document. The file path may comprise the directory location of the document within a file storage system. Data may likewise be tokenized by associating an identifier or "token" with the data. A token may, in various embodiments, comprise a random number, which may be associated with the data.

Figure 1A:
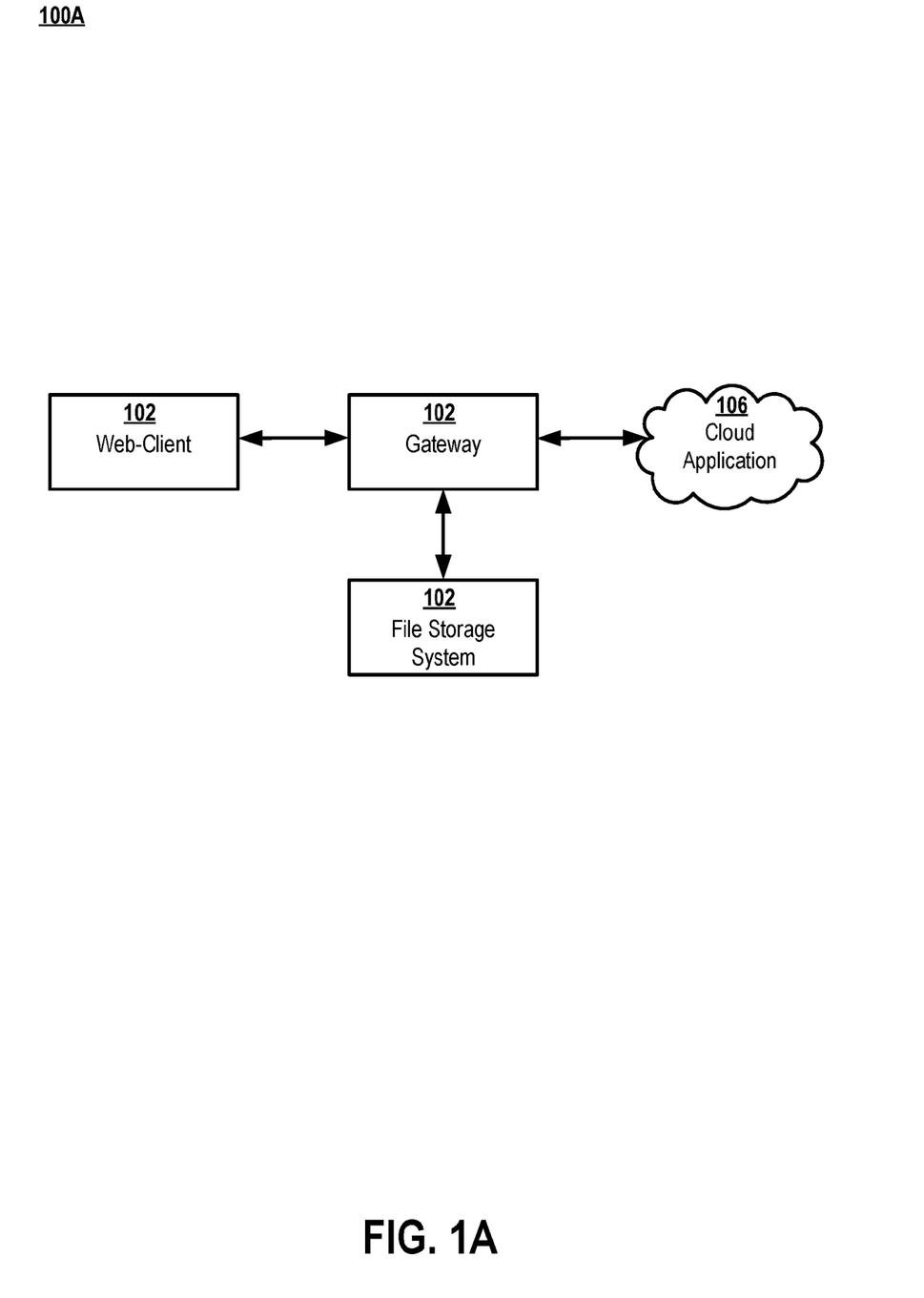
FIG. 1A illustrates, in accordance with various embodiments, a system for protecting a sensitive document.

Referring to FIG. 1A, a system 100A for protecting a sensitive document is shown. The system 100A may comprise a web-client 102, a gateway 104, a cloud application 106, and/or a file storage system 108.

A web-client 102 may include any device (e.g., personal computing device/mobile communication device) which communicates via any network. A web-client 102 may communicate (e.g., via a network) with a gateway 104. Web-client 102 may be associated with and/or used by a consumer, a merchant, or both. Web-client may comprise a variety of browsing software or browser applications (e.g., Microsoft Internet Explorer, Mozilla Firefox, Google Chrome, Apple Safari, or any other of the myriad software packages available for browsing the internet). Such browser applications may comprise Internet browsing software installed within a computing unit or a system to conduct online transactions and/or communications. These computing units or systems may take the form of a computer or processor, or a set of computers/processors, although other types of computing units or systems may be used, including laptops, notebooks, hand held computers, personal digital assistants, cellular phones, smart phones (e.g., iPhone®, BlackBerry®, Droid®, etc.) set-top boxes, workstations, computer-servers, main frame computers, mini-computers, PC servers, pervasive computers, network sets of computers, personal computers, such as iPads, iMACs, and MacBooks, kiosks, terminals, point of sale (POS) devices and/or terminals, televisions, or any other device capable of receiving data over a network.

As those skilled in the art will appreciate, web-client 102 may include an operating system (e.g., Windows NT, 95/98/2000/CE/Mobile, OS2, UNIX, Linux, Solaris, MacOS, PalmOS, etc.) as well as various conventional support software and drivers typically associated with computers. A web-client may implement security protocols such as Secure Sockets Layer (SSL) and Transport Layer Security (TLS). A web-client may implement one or more application layer protocols, including, for example, http, https, ftp, and sftp. Transactions originating at a web client may pass through a firewall (not shown; see below) in order to prevent unauthorized access from users of other networks.

A gateway 104 may comprise any hardware and/or software configured to communicate with a cloud application 106, a web-client 102, a file storage system 108, and/or a transaction vault 110, as described below. For example, a gateway 104 may perform encryption/decryption operations as well as tokenize a document and/or data.

Encryption may be performed by way of any of the techniques now available in the art or which may become available—e.g., Twofish, RSA, El Gamal, Schorr signature, DSA, PGP, PKI, and symmetric and asymmetric cryptosystems.

A cloud application 106 may comprise any software application that functions within a cloud computing environment. Briefly, a cloud computing environment may comprise a network of remote servers hosted on the internet to store, manage, and/or process data. Thus, a cloud computing environment may serve, for example, to replace one or more local servers or personal computers.

A file storage system 108 may comprise any combination of hardware and/or software configured to store documents and/or data. For example, a file storage system 108 may comprise one or more databases, hard disk drives, and the like.

Figure 1B:
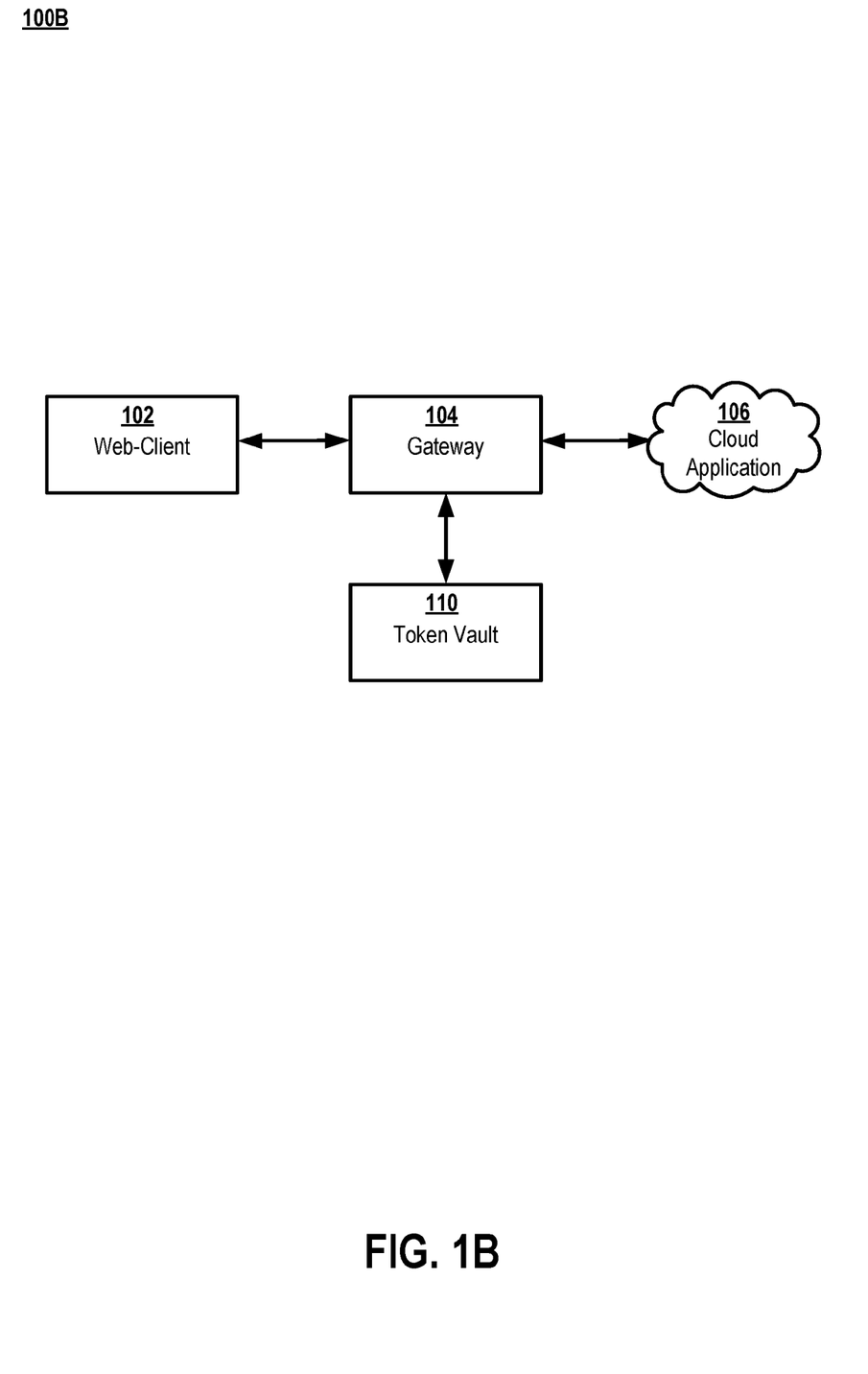
FIG. 1B illustrates, in accordance with various embodiments, a system for protecting sensitive data.

With reference now to FIG. 1B, a system 100B for protecting sensitive data is shown. The system may comprise a web-client 102. Similarly, the system may comprise a gateway 104 as well as one or more cloud applications 106. The system 100B may further comprise a token vault 110.

A token vault 110 may comprise a data storage system, such as one or more databases, that store one or more tokens. As described herein, a document and/or data may be associated with a token—"tokenized." Where data is tokenized, the token associated with the data may be stored securely within the token vault 110. A mapping table may be stored within the token vault 110 to map data to its corresponding token.

Figure 2A:
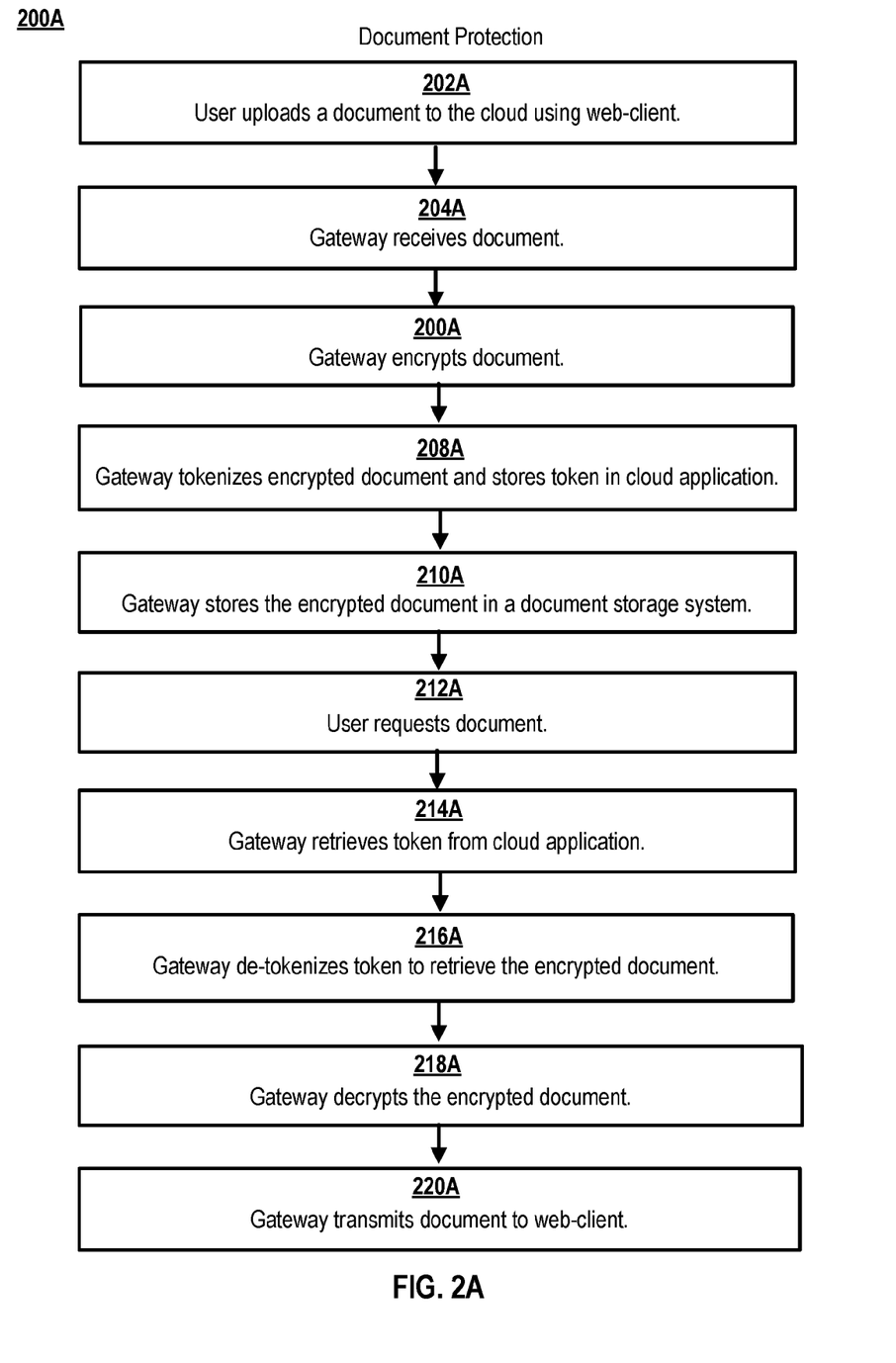
FIG. 2A illustrates, in accordance with various embodiments, a process for protecting a sensitive document.

With reference to FIG. 2A, an example process 200A for protecting one or more sensitive documents is disclosed. Returning briefly to the definition of document, a document may be referenced and accessed by a file path associated with the document (e.g., C:/mydocuments/patent applications/systems and methods for document and data protection).

Accordingly, to protect the document, a user of a web-client 102 may upload the document to a cloud application 106 residing within a cloud computing environment and/or a gateway 104 (step 202A). The gateway 104 may receive the document (step 204A) and/or encrypt the document (step 206A). In response to encrypting the document, the gateway 104 may tokenize the document by associating the file or directory path of the document with the document. This document token may be stored by the gateway 104 (e.g., via a network) to a cloud application 106 (step 208A). The gateway 104 may further store the encrypted document to the file storage system 108.

In response to a request by a user for a particular document (e.g., via the web-client 102) (step 212A), the gateway may retrieve the token associated with the document from the cloud application 106 (step 214A). This may occur, for example, in response to a request from the gateway for the token from the cloud application 106. In various embodiments, the gateway 104 may "de-tokenize" the token, meaning that the gateway 104 may read and/or store the file or directory path comprising the token. The gateway 104 may further request, retrieve, and/or receive the encrypted document associated with the token from the file storage system 108 (step 216A). The gateway 104 may, in addition, decrypt the encrypted document (step 218A), and communicate the decrypted document to the user (step 220A).

Figure 2B:
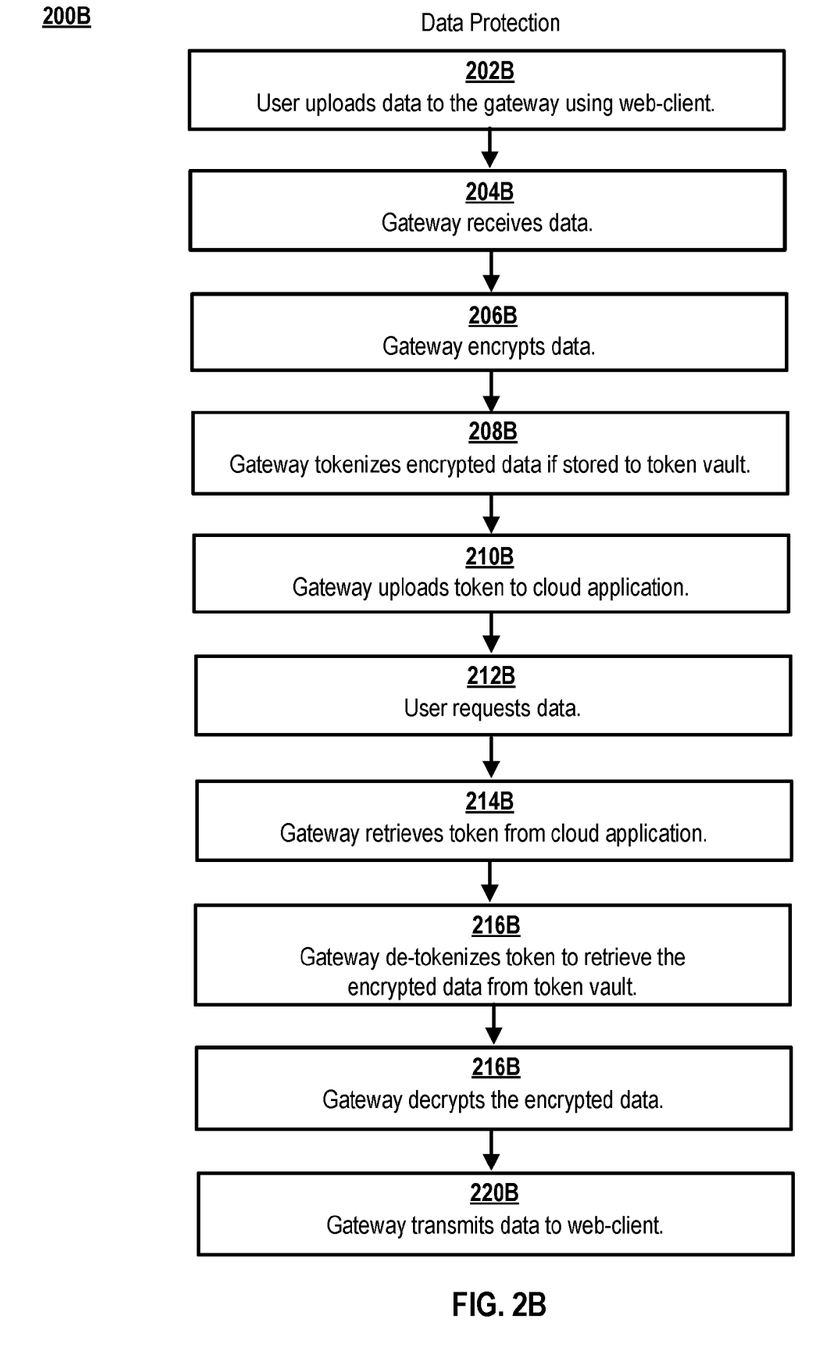
FIG. 2B illustrates, in accordance with various embodiments, a process for protecting sensitive data.

With reference now to FIG. 2B, a process 200B for protecting sensitive data is shown. In various embodiments, a user may upload, using a web-client 102, data to the gateway 104 (step 202B). The gateway 104 may receive the data (step 204B). In response to receiving the data, the gateway 104 may encrypt the data and/or store it to the token vault 110 (step 206B). The gateway may further tokenize the data (step 208B). For example, the gateway 104 may generate a random number or "token," and associate that token with the encrypted data stored in the token vault 110. As described herein, the token vault 110 may include a mapping table (or other data structure, such as a database, suitable for storing a mapping between one or more tokens and one or more encrypted data elements). The token may therefore be stored by the gateway 104 with its associated mapping in the mapping table held within the token vault 110. The gateway 104 may upload one or more tokens associated with one or more data elements to the cloud application 106 (step 210B).

In various embodiments, the user may request data (e.g., using the web-client 102) (step 212B). The gateway 104 may receive this request and retrieve one or more tokens associated with the requested data from the cloud application 106 (step 214B). The gateway 104 may de-tokenize the token to retrieve the encrypted data from the token vault 110 (step 216B). As described herein, the process of de-tokenization may simply comprise locating, within the mapping table, the data stored in association with the token or tokens. The gateway 104 may further decrypt the data retrieved from the token vault 110 (step 218B). In response to decrypting the data, the gateway 104 may communicate the data to the user's web-client 102 (step 220B).

Thus, the systems and methods 100A, 100B, 200A, and 200B may mitigate the data insecurities and problems associated with many conventional systems. For example, although a conventional system may store a token to a cloud application, the system may leave the documents and/or data associated with the token unencrypted and open to theft by a hacker. Moreover, where a conventional system may leave the documents and data unencrypted, the systems and methods 100A, 100B, 200A, and 200B may encrypt the documents and data, so that even a compromised token (e.g., in the case of data) will lead to unsuccessful data theft. Further still, the systems and methods 100A, 100B, 200A, and 200B described herein permit the storage of encrypted documents and data across international borders, as described above, as well as the storage of documents and data greater than a particular size accepted by a could provider.

As used herein, the term "network" includes any cloud, cloud computing system or electronic communications system or method which incorporates hardware and/or software components. Communication among the parties may be accomplished through any suitable communication channels, such as, for example, a telephone network, an extranet, an intranet, Internet, point of interaction device (point of sale device, personal digital assistant (e.g., iPhone®, Palm Pilot®, Blackberry®), cellular phone, kiosk, etc.), online communications, satellite communications, off-line communications, wireless communications, transponder communications, local area network (LAN), wide area network (WAN), virtual private network (VPN), networked or linked devices, keyboard, mouse and/or any suitable communication or data input modality. Moreover, although the system is frequently described herein as being implemented with TCP/IP communications protocols, the system may also be implemented using IPX, Appletalk, IP-6, NetBIOS, OSI, any tunneling protocol (e.g. IPsec, SSH), or any number of existing or future protocols. If the network is in the nature of a public network, such as the Internet, it may be advantageous to presume the network to be insecure and open to eavesdroppers. Specific information related to the protocols, standards, and application software utilized in connection with the Internet is generally known to those skilled in the art and, as such, need not be detailed herein. See, for example, DILIP NAIK, INTERNET STANDARDS AND PROTOCOLS (1998); JAVA 2 COMPLETE, various authors, (Sybex 1999); DEBORAH RAY AND ERIC RAY, MASTERING HTML 4.0 (1997); and LOSHIN, TCP/IP CLEARLY EXPLAINED (1997) and DAVID GOURLEY AND BRIAN TOTTY, HTTP, THE DEFINITIVE GUIDE (2002), the contents of which are hereby incorporated by reference. The various system components described herein may be independently, separately or collectively coupled to the network via one or more data links including, for example, a connection to an Internet Service Provider (ISP) over a local loop as is typically used in connection with standard modem communication, cable modem, Dish networks, ISDN, Digital Subscriber Line (DSL), or various wireless communication methods, see, e.g., GILBERT HELD, UNDERSTANDING DATA COMMUNICATIONS (1996), which is hereby incorporated by reference. It is noted that the network may be implemented variously. For example, network may be implemented as an interactive television (ITV) network. The systems and methods disclosed herein contemplate the use, sale and/or distribution of any goods, services or information over any network having functionality similar to that described above with reference to network.

The various system components described herein may be independently, separately or collectively coupled to the network via one or more data links including, for example, a connection to an Internet Service Provider (ISP) over a local loop as is typically used in connection with standard modem communication, cable modem, Dish networks, ISDN, Digital Subscriber Line (DSL), or various wireless communication methods, see, e.g., GILBERT HELD, UNDERSTANDING DATA COMMUNICATIONS (1996), which is hereby incorporated by reference. It is noted that the network may be implemented variously. For example, network may be implemented as an interactive television (ITV) network. The systems and methods disclosed herein contemplate the use, sale and/or distribution of any goods, services or information over any network having functionality similar to that described above with reference to network.

Phrases and terms similar to a "transaction account holder," "buyer," "participant", "consumer," and/or "user" may include any person, entity, software and/or hardware that receives items in exchange for consideration (e.g. financial payment). For example, a buyer may purchase, lease, rent, barter or otherwise obtain items from a supplier and pay the supplier using a transaction account.

As used herein, "transmit" may include sending electronic data from one system component to another over a network connection. Additionally, as used herein, "data" may include encompassing information such as commands, queries, files, data for storage, and the like in digital or any other form.

Phrases or terms similar to "transaction account" may include any account that may be used to facilitate a financial transaction. A "transaction account" as used herein refers to an account associated with an open account or a closed account system (as described herein). The transaction account may exist in a physical or non-physical embodiment. For example, a transaction account may be distributed in non-physical embodiments such as an account number, frequent-flyer account, and telephone calling account or the like. Furthermore, a physical embodiment of a transaction account may be distributed as a financial instrument.

In general, transaction accounts may be used for transactions between the user (or "transaction account holder") and merchant through any suitable communication means, such as, for example, a telephone network, intranet, the global, public Internet, a point of interaction device (e.g., a point of sale (POS) device, personal digital assistant (PDA), mobile telephone, kiosk, etc.), online communications, off-line communications, wireless communications, and/or the like.

Phrases and terms similar to an "item" may include any good, service, information, experience, data, discount, rebate, points, virtual currency, content, access, rental, lease, contribution, account, credit, debit, benefit, right, reward, points, coupons, credits, monetary equivalent, anything of value, something of minimal or no value, monetary value, non-monetary value and/or the like. Moreover, the "transactions" or "purchases" discussed herein may be associated with an item. Furthermore, a "reward" may be an item.

An "account", "account code", or "account number", as used herein, may include any device, code, number, letter, symbol, digital certificate, smart chip, digital signal, analog signal, biometric or other identifier/indicia suitably configured to allow the consumer to access, interact with or communicate with the system (e.g., one or more of an authorization/access code, personal identification number (PIN), Internet code, other identification code, and/or the like). The account number may optionally be located on or associated with a rewards card, charge card, credit card, debit card, prepaid card, telephone card, embossed card, smart card, magnetic stripe card, bar code card, transponder, radio frequency card or an associated account. The system may include or interface with any of the foregoing cards or devices, QR codes, Bluetooth, Near Field Communication, or a transponder and RFID reader in RF communication with the transponder (which may include a fob). Typical devices may include, for example, a key ring, tag, card, cell phone, wristwatch or any such form capable of being presented for interrogation.

As used herein, a system, computing unit or device may include a "pervasive computing device," which may include a traditionally non-computerized device that is embedded with a computing unit. Examples can include watches, Internet enabled kitchen appliances, restaurant tables embedded with RF readers, wallets or purses with imbedded transponders, etc.

The account code may be distributed and stored in any form of plastic, electronic, magnetic, radio frequency, wireless, audio and/or optical device capable of transmitting or downloading data from itself to a second device. A customer account code may be, for example, a sixteen-digit transaction account code, although each transaction account provider has its own numbering system, such as the fifteen-digit numbering system used by American Express. Each company's transaction account codes comply with that company's standardized format such that the company using a fifteen-digit format will generally use three-spaced sets of numbers, as represented by the number "0000 000000 00000". The first five to seven digits are reserved for processing purposes and identify the issuing bank, card type, etc. In this example, the last (fifteenth) digit is used as a sum check for the fifteen digit number. The intermediary eight-to-eleven digits are used to uniquely identify the customer. A merchant account code may be, for example, any number or alpha-numeric characters that identify a particular merchant for purposes of card acceptance, account reconciliation, reporting, or the like.

It should be noted that the transfer of information in accordance with the present disclosure, may be completed in a format recognizable by a merchant system or account issuer. In that regard, by way of example, the information may be transmitted from a contactless (e.g., an RFID device) to a contactless (e.g., RFID) reader or from the contactless reader to the merchant system in a variety of formats, e.g., magnetic stripe or multi-track magnetic stripe format.

As used herein, phrases and terms similar to "financial institution," "transaction account issuer" and "payment processor" may include any person, entity, software and/or hardware that offers transaction account services. Although often referred to as a "financial institution," the financial institution may represent any type of bank, lender or other type of account issuing institution, such as credit card companies, card sponsoring companies, or third party issuers under contract with financial institutions. It is further noted that other participants may be involved in some phases of the transaction, such as an intermediary settlement institution.

The terms "payment vehicle," "financial transaction instrument," "transaction instrument," or "transaction account product" may be used interchangeably throughout to refer to a financial instrument. As used herein, an account code may or may not be associated with a physical financial instrument.

In the detailed description herein, references to "one embodiment", "an embodiment", "an example embodiment", "various embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. After reading the description, it will be apparent to one skilled in the relevant art(s) how to implement the disclosure in certain embodiments.

In various embodiments, the methods described herein are implemented using the various particular machines described herein. The methods described herein may be implemented using the particular machines, and those hereinafter developed, in any suitable combination, as would be appreciated immediately by one skilled in the art. Further, as is unambiguous from this disclosure, the methods described herein may result in various transformations of certain articles.

For the sake of brevity, conventional data networking, application development and other functional aspects of the systems (and components of the individual operating components of the systems) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in a practical system.

The various system components discussed herein may include one or more of the following: a host server or other computing systems including a processor for processing digital data; a memory coupled to the processor for storing digital data; an input digitizer coupled to the processor for inputting digital data; an application program stored in the memory and accessible by the processor for directing processing of digital data by the processor; a display device coupled to the processor and memory for displaying information derived from digital data processed by the processor; and a plurality of databases. Various databases used herein may include: client data; merchant data; financial institution data; and/or like data useful in the operation of the system. As those skilled in the art will appreciate, user computer may include an operating system (e.g., Windows NT, 95/98/2000, XP, Vista, OS2, UNIX, Linux, Solaris, MacOS, etc.)

as well as various conventional support software and drivers typically associated with computers. A user may include any individual, business, entity, government organization, software and/or hardware that interact with a system.

In an embodiment, various components, modules, and/or engines of the systems described herein may be implemented as micro-applications or micro-apps. Micro-apps are typically deployed in the context of a mobile operating system, including for example, a Palm mobile operating system, a Windows mobile operating system, an Android Operating System, Apple iOS, a Blackberry operating system and the like. The micro-app may be configured to leverage the resources of the larger operating system and associated hardware via a set of predetermined rules which govern the operations of various operating systems and hardware resources. For example, where a micro-app desires to communicate with a device or network other than the mobile device or mobile operating system, the micro-app may leverage the communication protocol of the operating system and associated device hardware under the predetermined rules of the mobile operating system. Moreover, where the micro-app desires an input from a user, the micro-app may be configured to request a response from the operating system which monitors various hardware components and then communicates a detected input from the hardware to the micro-app.

The system contemplates uses in association with web services, utility computing, pervasive and individualized computing, security and identity solutions, autonomic computing, cloud computing, commodity computing, mobility and wireless solutions, open source, biometrics, grid computing and/or mesh computing.

Any databases discussed herein may include relational, hierarchical, graphical, or object-oriented structure and/or any other database configurations. Common database products that may be used to implement the databases include DB2 by IBM (Armonk, N.Y.), various database products available from Oracle Corporation (Redwood Shores, Calif.), Microsoft Access or Microsoft SQL Server by Microsoft Corporation (Redmond, Wash.), MySQL by MySQL AB (Uppsala, Sweden), or any other suitable database product. Moreover, the databases may be organized in any suitable manner, for example, as data tables or lookup tables. Each record may be a single file, a series of files, a linked series of data fields or any other data structure. Association of certain data may be accomplished through any desired data association technique such as those known or practiced in the art. For example, the association may be accomplished either manually or automatically. Automatic association techniques may include, for example, a database search, a database merge, GREP, AGREP, SQL, using a key field in the tables to speed searches, sequential searches through all the tables and files, sorting records in the file according to a known order to simplify lookup, and/or the like. The association step may be accomplished by a database merge function, for example, using a "key field" in pre-selected databases or data sectors. Various database tuning steps are contemplated to optimize database performance. For example, frequently used files such as indexes may be placed on separate file systems to reduce In/Out ("I/O") bottlenecks.

More particularly, a "key field" partitions the database according to the high-level class of objects defined by the key field. For example, certain types of data may be designated as a key field in a plurality of related data tables and the data tables may then be linked on the basis of the type of data in the key field. The data corresponding to the key field in each of the linked data tables is preferably the same or of the same type. However, data tables having similar, though not identical, data in the key fields may also be linked by using AGREP, for example. In accordance with one embodiment, any suitable data storage technique may be utilized to store data without a standard format. Data sets may be stored using any suitable technique, including, for example, storing individual files using an ISO/IEC 7816-4 file structure; implementing a domain whereby a dedicated file is selected that exposes one or more elementary files containing one or more data sets; using data sets stored in individual files using a hierarchical filing system; data sets stored as records in a single file (including compression, SQL accessible, hashed via one or more keys, numeric, alphabetical by first tuple, etc.); Binary Large Object (BLOB); stored as ungrouped data elements encoded using ISO/IEC 7816-6 data elements; stored as ungrouped data elements encoded using ISO/IEC Abstract Syntax Notation (ASN.1) as in ISO/IEC 8824 and 8825; and/or other proprietary techniques that may include fractal compression methods, image compression methods, etc.

In one exemplary embodiment, the ability to store a wide variety of information in different formats is facilitated by storing the information as a BLOB. Thus, any binary information can be stored in a storage space associated with a data set. As discussed above, the binary information may be stored on the financial transaction instrument or external to but affiliated with the financial transaction instrument. The BLOB method may store data sets as ungrouped data elements formatted as a block of binary via a fixed memory offset using either fixed storage allocation, circular queue techniques, or best practices with respect to memory management (e.g., paged memory, least recently used, etc.). By using BLOB methods, the ability to store various data sets that have different formats facilitates the storage of data associated with the financial transaction instrument by multiple and unrelated owners of the data sets. For example, a first data set which may be stored may be provided by a first party, a second data set which may be stored may be provided by an unrelated second party, and yet a third data set which may be stored, may be provided by an third party unrelated to the first and second party. Each of these three exemplary data sets may contain different information that is stored using different data storage formats and/or techniques. Further, each data set may contain subsets of data that also may be distinct from other subsets.

As stated above, in various embodiments, the data can be stored without regard to a common format. However, in one exemplary embodiment, the data set (e.g., BLOB) may be annotated in a standard manner when provided for manipulating the data onto the financial transaction instrument. The annotation may comprise a short header, trailer, or other appropriate indicator related to each data set that is configured to convey information useful in managing the various data sets. For example, the annotation may be called a "condition header", "header", "trailer", or "status", herein, and may comprise an indication of the status of the data set or may include an identifier correlated to a specific issuer or owner of the data. In one example, the first three bytes of each data set BLOB may be configured or configurable to indicate the status of that particular data set; e.g., LOADED, INITIALIZED, READY, BLOCKED, REMOVABLE, or DELETED. Subsequent bytes of data may be used to indicate for example, the identity of the issuer, user, transaction/membership account identifier or the like. Each of these condition annotations are further discussed herein.

The data set annotation may also be used for other types of status information as well as various other purposes. For example, the data set annotation may include security information establishing access levels. The access levels may, for example, be configured to permit only certain individuals, levels of employees, companies, or other entities to access data sets, or to permit access to specific data sets based on the transaction, merchant, issuer, user or the like. Furthermore, the security information may restrict/permit only certain actions such as accessing, modifying, and/or deleting data sets. In one example, the data set annotation indicates that only the data set owner or the user are permitted to delete a data set, various identified users may be permitted to access the data set for reading, and others are altogether excluded from accessing the data set. However, other access restriction parameters may also be used allowing various entities to access a data set with various permission levels as appropriate.

The data, including the header or trailer may be received by a stand alone interaction device configured to add, delete, modify, or augment the data in accordance with the header or trailer. As such, in one embodiment, the header or trailer is not stored on the transaction device along with the associated issuer-owned data but instead the appropriate action may be taken by providing to the transaction instrument user at the stand alone device, the appropriate option for the action to be taken. The system may contemplate a data storage arrangement wherein the header or trailer, or header or trailer history, of the data is stored on the transaction instrument in relation to the appropriate data.

One skilled in the art will also appreciate that, for security reasons, any databases, systems, devices, servers or other components of the system may consist of any combination thereof at a single location or at multiple locations, wherein each database or system includes any of various suitable security features, such as firewalls, access codes, encryption, decryption, compression, decompression, and/or the like.

A firewall may comprise any hardware and/or software suitably configured to protect systems, components, and/or enterprise computing resources from users of other networks. Further, a firewall may be configured to limit or restrict access to various systems and components behind the firewall for web clients connecting through a web server. A firewall may reside in varying configurations including Stateful Inspection, Proxy based, access control lists, and Packet Filtering among others. A firewall may be integrated within a web server or any other CMS components or may further reside as a separate entity. A firewall may implement network address translation ("NAT") and/or network address port translation ("NAPT"). A firewall may accommodate various tunneling protocols to facilitate secure communications, such as those used in virtual private networking. A firewall may implement a demilitarized zone ("DMZ") to facilitate communications with a public network such as the Internet. A firewall may be integrated as software within an Internet server, any other application server components or may reside within another computing device or may take the form of a standalone hardware component.

The computers discussed herein may provide a suitable website or other Internet-based graphical user interface which is accessible by users. In one embodiment, the Microsoft Internet Information Server (IIS), Microsoft Transaction Server (MTS), and Microsoft SQL Server, are used in conjunction with the Microsoft operating system, Microsoft NT web server software, a Microsoft SQL Server database system, and a Microsoft Commerce Server. Additionally, components such as Access or Microsoft SQL Server, Oracle, Sybase, Informix MySQL, Interbase, etc., may be used to provide an Active Data Object (ADO) compliant database management system. In one embodiment, the Apache web server is used in conjunction with a Linux operating system, a MySQL database, and the Perl, PHP, and/or Python programming languages.

Any of the communications, inputs, storage, databases or displays discussed herein may be facilitated through a website having web pages. The term "web page" as it is used herein is not meant to limit the type of documents and applications that might be used to interact with the user. For example, a typical website might include, in addition to standard HTML documents, various forms, Java applets, JavaScript, active server pages (ASP), common gateway interface scripts (CGI), extensible markup language (XML), dynamic HTML, cascading style sheets (CSS), AJAX (Asynchronous Javascript And XML), helper applications, plug-ins, and the like. A server may include a web service that receives a request from a web server, the request including a URL (http://yahoo.com/stockquotes/ge) and an IP address (123.56.789.234). The web server retrieves the appropriate web pages and sends the data or applications for the web pages to the IP address. Web services are applications that are capable of interacting with other applications over a communications means, such as the internet. Web services are typically based on standards or protocols such as XML, SOAP, AJAX, WSDL and UDDI. Web services methods are well known in the art, and are covered in many standard texts. See, e.g., ALEX NGHIEM, IT WEB SERVICES: A ROADMAP FOR THE ENTERPRISE (2003), hereby incorporated by reference.

Middleware may include any hardware and/or software suitably configured to facilitate communications and/or process transactions between disparate computing systems. Middleware components are commercially available and known in the art. Middleware may be implemented through commercially available hardware and/or software, through custom hardware and/or software components, or through a combination thereof. Middleware may reside in a variety of configurations and may exist as a standalone system or may be a software component residing on the Internet server. Middleware may be configured to process transactions between the various components of an application server and any number of internal or external systems for any of the purposes disclosed herein. WebSphere MQ™ (formerly MQSeries) by IBM, Inc. (Armonk, N.Y.) is an example of a commercially available middleware product. An Enterprise Service Bus ("ESB") application is another example of middleware.

Practitioners will also appreciate that there are a number of methods for displaying data within a browser-based document. Data may be represented as standard text or within a fixed list, scrollable list, drop-down list, editable text field, fixed text field, pop-up window, and the like. Likewise, there are a number of methods available for modifying data in a web page such as, for example, free text entry using a keyboard, selection of menu items, check boxes, option boxes, and the like.

The system and method may be described herein in terms of functional block components, screen shots, optional selections and various processing steps. It should be appreciated that such functional blocks may be realized by any number of hardware and/or software components configured to perform the specified functions. For example, the system may employ various integrated circuit components, e.g., memory elements, processing elements, logic elements, look-up tables, and the like, which may carry out a variety of functions under the control of one or more microprocessors or other control devices. Similarly, the software elements of the system may be implemented with any programming or scripting language such as C, C++, C#, Java, JavaScript, VBScript, Macromedia Cold Fusion, COBOL, Microsoft Active Server Pages, assembly, PERL, PHP, awk, Python, Visual Basic, SQL Stored Procedures, PL/SQL, any UNIX shell script, and extensible markup language (XML) with the various algorithms being implemented with any combination of data structures, objects, processes, routines or other programming elements. Further, it should be noted that the system may employ any number of conventional techniques for data transmission, signaling, data processing, network control, and the like. Still further, the system could be used to detect or prevent security issues with a client-side scripting language, such as JavaScript, VBScript or the like. For a basic introduction of cryptography and network security, see any of the following references: (1) "Applied Cryptography: Protocols, Algorithms, And Source Code In C," by Bruce Schneier, published by John Wiley & Sons (second edition, 1995); (2) "Java Cryptography" by Jonathan Knudson, published by O'Reilly & Associates (1998); (3) "Cryptography & Network Security: Principles & Practice" by William Stallings, published by Prentice Hall; all of which are hereby incorporated by reference.

Each participant is equipped with a computing device in order to interact with the system and facilitate online commerce transactions. The customer has a computing unit in the form of a personal computer, although other types of computing units may be used including laptops, notebooks, hand held computers, set-top boxes, cellular telephones, touch-tone telephones and the like. The merchant has a computing unit implemented in the form of a computer-server, although other implementations are contemplated by the system. The bank has a computing center shown as a main frame computer. However, the bank computing center may be implemented in other forms, such as a mini-computer, a PC server, a network of computers located in the same of different geographic locations, or the like. Moreover, the system contemplates the use, sale or distribution of any goods, services or information over any network having similar functionality described herein.

The electronic commerce system may be implemented at the customer and issuing bank. In an exemplary implementation, the electronic commerce system is implemented as computer software modules loaded onto the customer computer and the banking computing center. The merchant computer does not require any additional software to participate in the online commerce transactions supported by the online commerce system.

As will be appreciated by one of ordinary skill in the art, the system may be embodied as a customization of an existing system, an add-on product, upgraded software, a stand alone system, a distributed system, a method, a data processing system, a device for data processing, and/or a computer program product. Accordingly, the system may take the form of an entirely software embodiment, an entirely hardware embodiment, or an embodiment combining aspects of both software and hardware. Furthermore, the system may take the form of a computer program product on a computer-readable storage medium having computer-readable program code means embodied in the storage medium. Any suitable computer-readable storage medium may be utilized, including hard disks, CD-ROM, optical storage devices, magnetic storage devices, and/or the like.

The system and method is described herein with reference to screen shots, block diagrams and flowchart illustrations of methods, apparatus (e.g., systems), and computer program products according to various embodiments. It will be understood that each functional block of the block diagrams and the flowchart illustrations, and combinations of functional blocks in the block diagrams and flowchart illustrations, respectively, can be implemented by computer program instructions.

These computer program instructions may be loaded onto a general purpose computer, special purpose computer, or other programmable data processing apparatus to produce a machine, such that the instructions that execute on the computer or other programmable data processing apparatus create means for implementing the functions specified in the flowchart block or blocks. These computer program instructions may also be stored in a computer-readable memory that can direct a computer or other programmable data processing apparatus to function in a particular manner, such that the instructions stored in the computer-readable memory produce an article of manufacture including instruction means which implement the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions specified in the flowchart block or blocks.

Accordingly, functional blocks of the block diagrams and flowchart illustrations support combinations of means for performing the specified functions, combinations of steps for performing the specified functions, and program instruction means for performing the specified functions. It will also be understood that each functional block of the block diagrams and flowchart illustrations, and combinations of functional blocks in the block diagrams and flowchart illustrations, can be implemented by either special purpose hardware-based computer systems which perform the specified functions or steps, or suitable combinations of special purpose hardware and computer instructions. Further, illustrations of the process flows and the descriptions thereof may make reference to user windows, webpages, websites, web forms, prompts, etc. Practitioners will appreciate that the illustrated steps described herein may comprise in any number of configurations including the use of windows, webpages, web forms, popup windows, prompts and the like. It should be further appreciated that the multiple steps as illustrated and described may be combined into single webpages and/or windows but have been expanded for the sake of simplicity. In other cases, steps illustrated and described as single process steps may be separated into multiple webpages and/or windows but have been combined for simplicity.

Benefits, other advantages, and solutions to problems have been described herein with regard to specific embodiments. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to 'at least one of A, B, and C' or 'at least one of A, B, or C' is used in the claims or specification, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Although the inventions have been described as a method in certain embodiments, it is contemplated that it may be embodied as computer program instructions on a tangible computer-readable carrier, such as a magnetic or optical memory or a magnetic or optical disk. All structural, chemical, and functional equivalents to the elements of the above-described exemplary embodiments that are known to those of ordinary skill in the art are expressly incorporated herein by reference and are intended to be encompassed by the present claims. Moreover, it is not necessary for a device or method to address each and every problem sought to be solved by the present disclosure, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A method comprising:
   intercepting, by a tokenization gateway computer-based system, sensitive data prior to the sensitive data reaching a cloud application,
   wherein the cloud application is in an externally hosted system,
   wherein the cloud application comprises a software application that functions within the externally hosted system, wherein the externally hosted system includes a cloud computing environment,
   associating, by the tokenization gateway computer-based system, a file path with the sensitive data;
   generating, by the tokenization gateway computer-based system, a token comprising a data identifier;
   tokenizing, by the tokenization gateway computer-based system and in response to the generating, the sensitive data;
   storing, by the tokenization gateway computer-based system and in response to the tokenizing, the token to the cloud application;
   storing, by the tokenization gateway computer-based system and in response to the storing the token to the cloud application, the sensitive data to a token vault,
   wherein the token vault is internal to the tokenization gateway computer-based system, and wherein the token vault comprises a data storage system;
   retrieving, by the tokenization gateway computer-based system, the token from the cloud application;
   reading, by the tokenization gateway computer-based system, the file path associated with the token; and
   in response to the reading the file path associated with the token, receiving, by the tokenization gateway computer-based system, the sensitive data.

2. The method of claim 1, wherein the token comprises the file path, wherein the file path comprises a directory location of the sensitive data within the data storage system.

3. The method of claim 1, wherein the token comprises a randomly generated value, and wherein a mapping table is stored in the token vault, wherein the mapping table maps the sensitive data to the token.

4. The method of claim 1, further comprising receiving, by the tokenization gateway computer-based system, a request for the sensitive data.

5. The method of claim 1, further comprising identifying, based upon the token associated with the sensitive data, the sensitive data.

6. The method of claim 1, wherein the sensitive data is being uploaded to the externally hosted system.

7. The method of claim 1, further comprising encrypting, by the tokenization gateway computer-based system and in response to the intercepting, the sensitive data to create encrypted sensitive data.

8. The method of claim 1, wherein the tokenizing comprises mapping the sensitive data to the token.

9. The method of claim 1, wherein the retrieving the token from the cloud application is in response to a request from the tokenization gateway computer-based system for the token from the cloud application.

10. The method of claim 1, wherein the receiving the sensitive data comprises receiving encrypted sensitive data.

11. A system comprising:
    a tangible, non-transitory memory communicating with a processor,
    the tangible, non-transitory memory having instructions stored thereon that, in response to execution by the processor, cause the processor to perform operations comprising:
    intercepting, by a tokenization gateway processor, sensitive data prior to the sensitive data reaching a cloud application,
    wherein the cloud application is in an externally hosted system,
    wherein the cloud application comprises a software application that functions within the externally hosted system, wherein the externally hosted system includes a cloud computing environment,
    associating, by the tokenization gateway processor, a file path with the sensitive data;
    generating, by the tokenization gateway processor, a token comprising a data identifier;
    tokenizing, by the tokenization gateway processor and in response to the generating, the sensitive data;
    storing, by the tokenization gateway processor and in response to the tokenizing, the token to the cloud application;
    storing, by the tokenization gateway processor and in response to the storing the token to the cloud application, the sensitive data to a token vault,
    wherein the token vault is internal to the tokenization gateway processor, and wherein the token vault comprises a data storage system;
    retrieving, by the tokenization gateway processor, the token from the cloud application;
    reading, by the tokenization gateway processor, the file path associated with the token; and
    in response to the reading the file path associated with the token, receiving, by the tokenization gateway processor, the sensitive data.

12. The system of claim 11, wherein the token comprises the file path, wherein the file path comprises a directory location of the sensitive data within the data storage system.

13. The system of claim 11, wherein the token comprises a randomly generated value, and wherein a mapping table is stored in the token vault, wherein the mapping table maps the sensitive data to the token.

14. The system of claim 11, further comprising receiving, by the tokenization gateway processor, a request for the sensitive data.

15. The system of claim 11, further comprising identifying, based upon the token associated with the sensitive data, the sensitive data.

16. An article of manufacture including a non-transitory, tangible computer readable storage medium having instructions stored thereon that, in response to execution by a tokenization gateway computer-based system, cause the tokenization gateway computer-based system to perform operations comprising:

intercepting, by the tokenization gateway computer-based system, sensitive data prior to the sensitive data reaching a cloud application,
   wherein the cloud application is in an externally hosted system,
   wherein the cloud application comprises a software application that functions within the externally hosted system, wherein the externally hosted system includes a cloud computing environment,
   associating, by the tokenization gateway computer-based system, a file path with the sensitive data;
   generating, by the tokenization gateway computer-based system, a token comprising a data identifier;
   tokenizing, by the tokenization gateway computer-based system and in response to the generating, the sensitive data;
   storing, by the tokenization gateway computer-based system and in response to the tokenizing, the token to the cloud application;
   storing, by the tokenization gateway computer-based system and in response to the storing the token to the cloud application, the sensitive data to a token vault,
   wherein the token vault is internal to the tokenization gateway computer-based system, and wherein the token vault comprises a data storage system;
   retrieving, by the tokenization gateway computer-based system, the token from the cloud application;
   reading, by the tokenization gateway computer-based system, the file path associated with the token; and
   in response to the reading the file path associated with the token, receiving, by the tokenization gateway computer-based system, the sensitive data.

\* \* \* \* \*